United States Patent
Muthukumar

(10) Patent No.: US 10,897,449 B2
(45) Date of Patent: Jan. 19, 2021

(54) SOCIAL MEDIA MESSAGING PLATFORM FOR CREATING AND SHARING MOMENTS

(71) Applicant: Twitter, Inc., San Francisco, CA (US)

(72) Inventor: Madhu Muthukumar, New York, NY (US)

(73) Assignee: Twitter, Inc., San Francisco, CA (US)

( * ) Notice: Subject to any disclaimer, the term of this patent is extended or adjusted under 35 U.S.C. 154(b) by 105 days.

(21) Appl. No.: 15/286,268

(22) Filed: Oct. 5, 2016

(65) Prior Publication Data
US 2017/0099253 A1 Apr. 6, 2017

Related U.S. Application Data

(60) Provisional application No. 62/238,094, filed on Oct. 6, 2015.

(51) Int. Cl.
| | |
|---|---|
| G06F 3/048 | (2013.01) |
| H04L 12/58 | (2006.01) |
| H04N 7/18 | (2006.01) |
| G06Q 50/00 | (2012.01) |
| G06F 16/951 | (2019.01) |
| G06N 20/00 | (2019.01) |

(52) U.S. Cl.
CPC .......... *H04L 51/32* (2013.01); *G06F 16/951* (2019.01); *G06Q 50/01* (2013.01); *H04L 51/08* (2013.01); *G06N 20/00* (2019.01)

(58) Field of Classification Search
CPC .......... G06F 17/30864; G06N 99/005; G06Q 50/01; H04L 51/08; H04L 51/32

USPC .......................................................... 709/219
See application file for complete search history.

(56) References Cited

U.S. PATENT DOCUMENTS

| | | | | |
|---|---|---|---|---|
| 5,596,750 | A * | 1/1997 | Li | G06F 9/466 |
| | | | | 707/999.104 |
| 8,156,442 | B2 * | 4/2012 | Aoki | G06Q 50/01 |
| | | | | 715/753 |
| 8,943,140 | B1 * | 1/2015 | Kothari | G06Q 10/1095 |
| | | | | 709/204 |
| 2003/0018966 | A1 * | 1/2003 | Cook | H04N 21/23424 |
| | | | | 725/2 |
| 2010/0273463 | A1 * | 10/2010 | Bonnefoy | H04W 4/023 |
| | | | | 455/414.1 |
| 2011/0158605 | A1 * | 6/2011 | Bliss | H04N 21/8405 |
| | | | | 386/241 |

(Continued)

*Primary Examiner* — Kevin T Bates
*Assistant Examiner* — Golam Mahmud
(74) *Attorney, Agent, or Firm* — Brake Hughes Bellermann LLP

(57) ABSTRACT

A messaging platform is configured to exchange social media messages, over a network, among a plurality of user devices each of which is executing a social media messaging application. The messaging platform is configured to provide, over the network, a moment of an event discussed by the social media messages for selection on a user interface of the social media messaging application. The moment is a collection of items that relate to the event, where the collection of items includes one or more selected messages that have been exchanged on the messaging platform that relate to the event. The collection of items can include text, video, and/or images of the event. When selected, the moment provides a display of the collection of items such that a user can view each item of the moment.

19 Claims, 7 Drawing Sheets

(56) References Cited

U.S. PATENT DOCUMENTS

| | | | |
|---|---|---|---|
| 2013/0073995 A1* | 3/2013 | Piantino | G06N 20/00 715/764 |
| 2013/0128038 A1* | 5/2013 | Cok | H04N 1/32101 348/143 |
| 2013/0159885 A1* | 6/2013 | Yerli | G06Q 30/0255 715/753 |
| 2014/0108929 A1* | 4/2014 | Garmark | H04N 21/8549 715/716 |
| 2014/0282096 A1* | 9/2014 | Rubinstein | G06F 3/04842 715/753 |
| 2014/0351012 A1* | 11/2014 | Jernigan | G06Q 30/0202 705/7.31 |
| 2014/0351030 A1* | 11/2014 | Priebatsch | G06Q 30/0211 705/14.13 |
| 2014/0365675 A1* | 12/2014 | Bhardwaj | H04N 21/8456 709/231 |
| 2015/0264006 A1* | 9/2015 | Parra | H04L 69/28 709/206 |
| 2016/0050289 A1* | 2/2016 | Cohen | H04L 67/306 709/204 |
| 2017/0039204 A1* | 2/2017 | Blanchflower | G06F 16/215 |
| 2017/0060396 A1* | 3/2017 | Lewis | H04L 65/60 |

* cited by examiner

SOCIAL MEDIA MESSAGING PLATFORM FOR CREATING AND SHARING MOMENTS

RELATED APPLICATION

This application is a non-provisional of, and claims priority to U.S. Provisional Application No. 62/238,094, filed Oct. 6, 2016, entitled "Social Media Content Analysis and Distribution," the disclosure of which is incorporated herein in its entirety.

BACKGROUND

A social media messaging platform may facilitate the exchange of millions or hundreds of millions of social media messages among its users. The messages exchanged on the platform often can provide users of the platform the latest update or reporting on current events. A user may need to know certain keywords or hashtags in order to search the social media messaging platform about information pertaining to a particular event, or be associated with particular user accounts (e.g., following certain users) in order to view messages exchanged on the platform about the event. In addition, a search of the platform with the appropriate keywords or hashtags still may not yield the most interesting messages about the underlying event, or may not provide results that can give the user an end-to-end perspective of how the event is unfolding.

SUMMARY

The embodiments provide a social media messaging platform that allows the creation and sharing of collections of social media messages (a.k.a. "moments") occurring within a messaging platform, where each collection of messages is related to an event occurring the world. The moments shared by the social media messaging platform can be manually created by individual users and/or editors associated with the social media messaging platform, programmatically created by a moment algorithm implemented at the social media messaging platform that automatically selects the most interesting/relevant content shared on the platform pertaining to certain events, or created through a combination of programmatic and manual steps. The social media messaging platform can surface the day's most talked-about stories in a new moment section of the application. The moment section may take the form a central tab on Android, iOS, and the web. When the application is opened (on a user's phone or on the web), the application provides a moments section alongside the standard timeline. A user may click or tap it, and the application provides a plurality of headlines pointing to the big events currently being discussed on the social media messaging platform. The user may click or tap again on one of these headlines, and the application will open that moment in order to view a selection of items that include selected social media messages related to the clicked headline.

Generally, a moment can be a collection of social media messages exchanged on the social media messaging platform about a particular underlying event. The collection of social media messages can be arranged in temporal order in order to give the user a sense of how the event is unfolding. The moment may include interesting commentary, stats, pictures, and videos from that event. The moment may combine text-only messages, photos, and videos, including both short video segments (e.g., Vines) and videos uploaded directly to the social media messaging platform. The moment can be viewed within the application by any user. When viewing a particular moment, a user can browse through the items by swiping or scrolling. Also, the user can take various actions with any of the social media messages within the moment such as favoriting them, sharing them via links, re-messaging them, etc. Also, moments can be embedded on third-party websites.

In some examples, users of the social media messaging platform may create their own moments using a moment creator interface on the social media messaging application, which allows individual users to search and select messages for inclusion within a particular moment. In some examples, editors associated with the platform may search and locate interesting social media messages about an underlying event, and include those messages within a particular moment which is shared on the moment section of the application. In some examples, the social media messaging platform may programmatically create a moment using a moment algorithm that can automatically select certain interesting social media messages for inclusion within a particular moment. Each moment can be updated in real time. For instance, a moment can have a beginning and an ending, and can change and evolve over time (e.g., new messages can be inserted into the moment or older messages can be deleted from the moment).

Users may follow some of the moments. For example, if a first user follows a second user, the social media messaging platform may link their user accounts, and the first user may receive and view the social media messages posted by the second user in the first user's home page (or timeline). When a user follows a moment, the social media messaging platform may inject social media messages of users linked to the moment in the user's home page or timeline. For example, if a user is watching a football game, or the latest episode of a television program, the user can opt to follow the moment around those two events. When a user follows that event, the social media messaging platform may inject a real-time feed of relevant social media messages into the user's timeline around that event. In the case of a football game, the social media messaging platform server may inject feeds of both teams participating in the game, broadcasters, other players, and/or the NFL itself.

As a result, users are unburdened from searching through the thousands of social media messages to find the most interesting ones, and/or relating to a particular event of interest, and/or identifying the right hashtags and sources for a particular event of interest.

DETAILED DISCLOSURE

Figure 1:
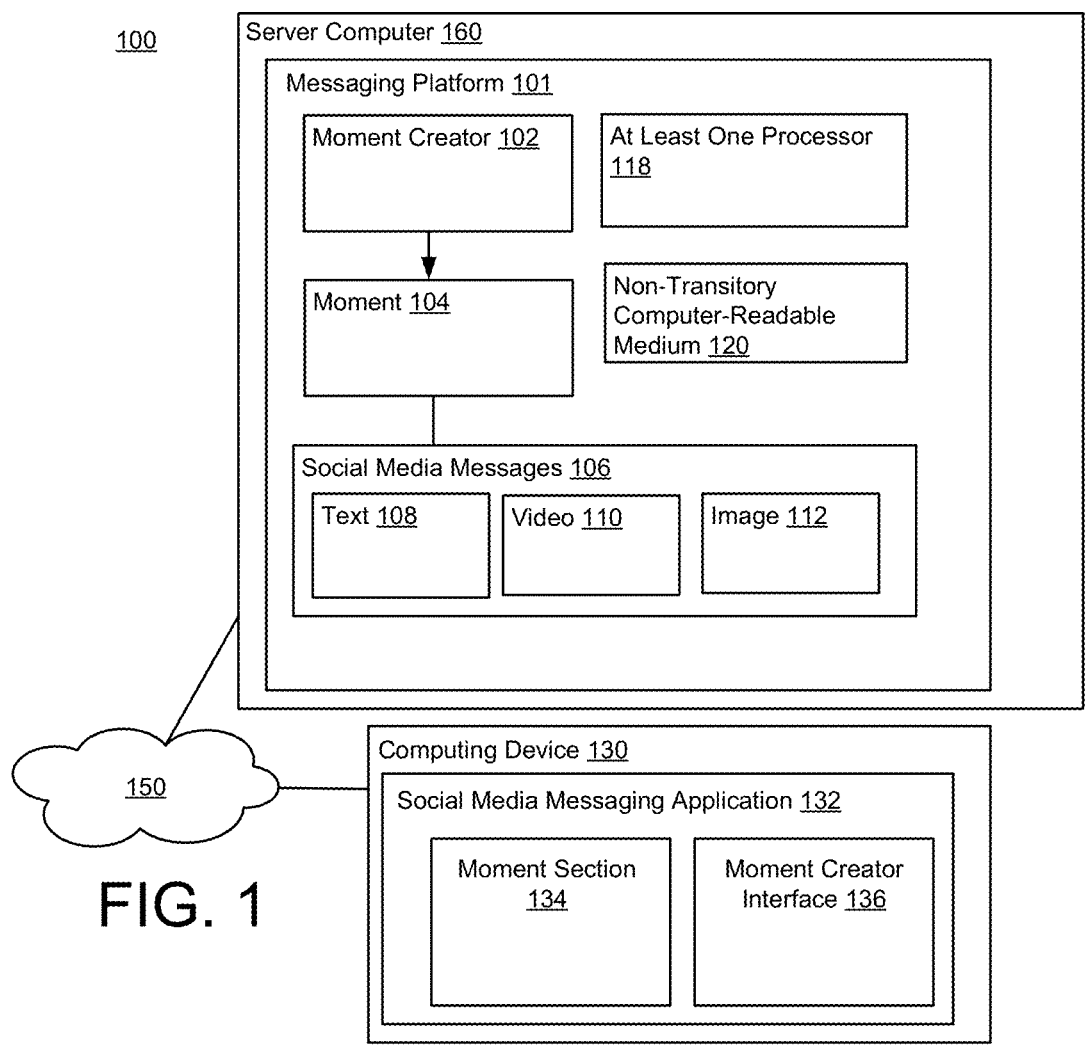
FIG. 1 is a schematic diagram of a system having a messaging platform that provides and shares moments around events discussed on the messaging platform according to an implementation.

FIG. 1 is a schematic diagram of a system 100 having a messaging platform 101 that provides and shares moments 104 around events discussed on the messaging platform 101 according to an implementation. The messaging platform 101 executes on a server computer 160. The server computer 160 may be a single computing device, or may be a representation of two or more distributed computing devices communicatively connected to share workload and resources. The server computer 160 may include at least one processor 118 and a non-transitory computer-readable medium 120 that stores executable instructions that when executed by the at least one processor 118 cause the at least one processor 118 to perform the operations discussed herein.

The messaging platform 101 is a platform for facilitating real-time communication between user devices (one of which is shown as computing device 130). The messaging platform 101 may store millions of accounts of individuals, businesses, and/or entities (e.g., pseudonym accounts, novelty accounts, etc.). One or more users of each account may use the messaging platform 101 to send messages to other accounts inside and/or outside of the messaging platform 101. The messaging platform 101 may be configured to enable users to communicate in "real-time", i.e., to converse with other users with minimal delay and to conduct a conversation with one or more other users during simultaneous sessions. In other words, the messaging platform 101 may allow a user to broadcast messages and may display the messages to one or more other users within a reasonable time frame so as to facilitate a live conversation between users. Recipients of a message may have a predefined graph relationship with an account of the user broadcasting the message.

The computing device 130 includes a social media messaging application 132 configured to communicate with the messaging platform 101 over a network 150. The social media messaging application 132 may be a native application executing on an operating system of the computing device 130 or may be a web-based application executing on the server computer 160 (or other server) in conjunction with a browser-based application of the computing device 130. The computing device 130 may access the messaging platform 101 via the network 150 through the use of any type of network connections and/or application programming interfaces (APIs) in a manner that permits the social media messaging application 132 and the messaging platform 101 to communicate with each other.

The computing device 130 may be a mobile computing device (e.g., a smart phone, a PDA, a tablet, or a laptop computer) or a non-mobile computing device (e.g., a desktop computing device). The computing device 130 also includes various network interface circuitry, such as for example, a mobile network interface through which the computing device 130 can communicate with a cellular network, a Wi-Fi network interface with which the computing device 130 can communicate with a Wi-Fi base station, a Bluetooth network interface with which the computing device 130 can communicate with other Bluetooth devices, and/or an Ethernet connection or other wired connection that enables the computing device 130 to access the network 150.

The messaging platform 101 may share moments 104, over the network 150, with the users of the social media messaging application 132. Moments 104 help users to view the most interesting/relevant content discussed on the messaging platform 101 pertaining to certain events. In some examples, the messaging platform 101 may provide selection of the moments 104 within a moment section 134 of the social media messaging application 132. The moment section 134 may provide a listing (or arrangement) of the moments 104 on a display of the computing device 130, which can be categorized by topic (e.g., politics, sports, entertainment, etc.). As new stories emerge throughout the day, this listing is updated to include additional moments 104 or a particular moment 104 is updated to include additional items.

A single moment 104 includes a collection of social media messages 106 pertaining to a certain topic or event. In some examples, a moment 104 may be represented by a computer object or element that identifies the collection of social media messages 106, and the computer object or element may include display format data that indicates how the messages are displayed on the computing device 130. The messaging platform 101 may embed the moments 104 on the social media messaging application 132. An embedded moment 104 may display multiple messages with edge-to-edge images and video displayed in a grid format. The grid widget display can operate on large displays, and can scale down to a single column on narrow displays such as a mobile phone. In some examples, an embedded moment 104 includes an embedded moment markup generator to allow copying and pasting a specifically-formatted link and JavaScript into a $3^{rd}$ party webpage. Also, the social media messaging application 132 may provide a menu on a moment's header to select "Embed Moment" to generate HTML markup to include on a $3^{rd}$ party webpage.

The social media messages 106 included within the moment 104 may include text 108, video 110, and/or images 112 that have been previously shared on the messaging platform 101. These items of the moment 104 may provide some of the more relevant and interesting information shared on the messaging platform 101 about the underlying event. In some examples, the items of the moment 104 may be arranged in temporal order in order to give the user a sense of how the event is unfolding. Each moment 104 has a beginning and an ending. A moment 104 may have a cover item having an image and text that describes the moment 104, and a last item that indicates that a user is caught up on the event (and permits the selection of other moments 104). The collection of social media messages 106 may be disposed between the cover item and the last item.

A moment 104 may include a first social media message, a second social media message, and a third social media message. However, a moment 104 may include any number of social media messages that have been previously posted by users of the messaging platform 101. The first social media message may have been posted by a first user (at time A) and includes text 108, the second social media message may have been posted by a second user (at time B) and includes a video 110 of an interesting part of the event, and the third social media message may have been posted by a third user (at time C), and includes an image 112 (and corresponding description) of the underlying event. This moment 104 may be created by identifying and/or searching the messaging platform 101, and including them in the moment 104. The moment 104 may specify the sequence of the messages, e.g., the first social media message is displayed first, followed by the second social media message, and then followed by the third social media message.

Figure 2:
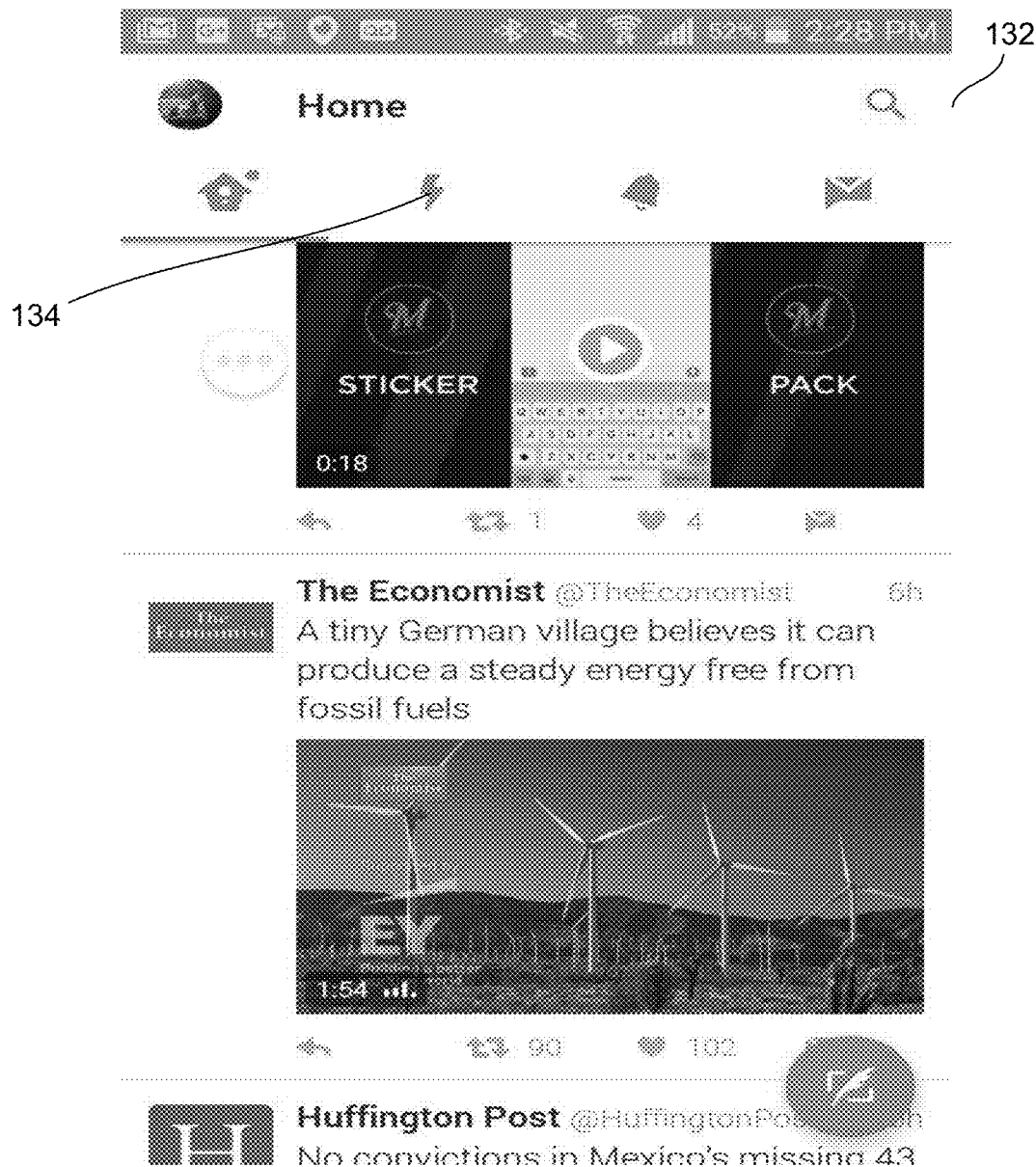
FIG. 2 illustrates an example screenshot of a mobile version of a social media messaging application having a moment section that provides the moments for selection according to an implementation.
Figure 3:
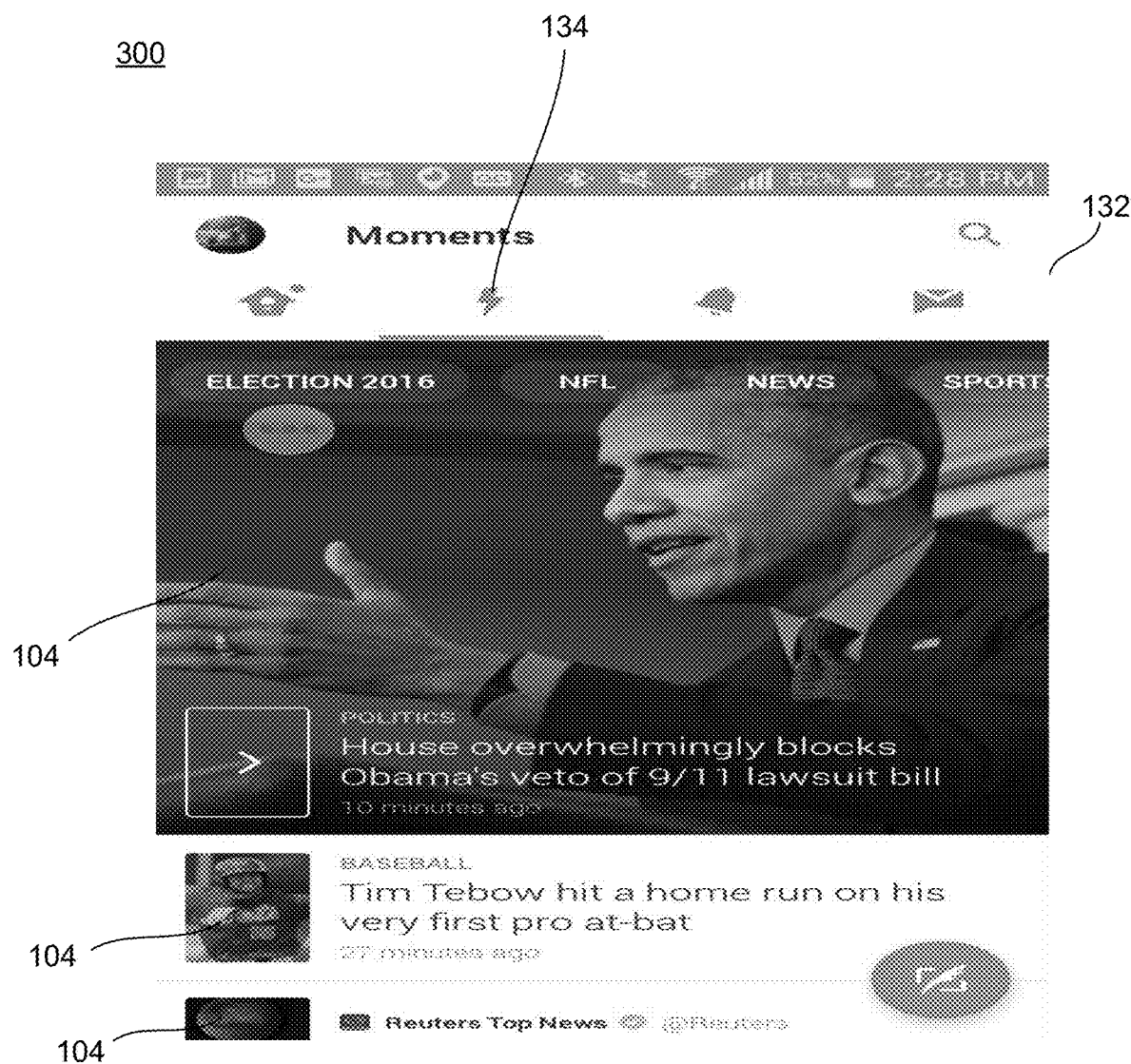
FIG. 3 illustrates an example screenshot of the moment section of the social media messaging application according to an implementation.
Figure 4:
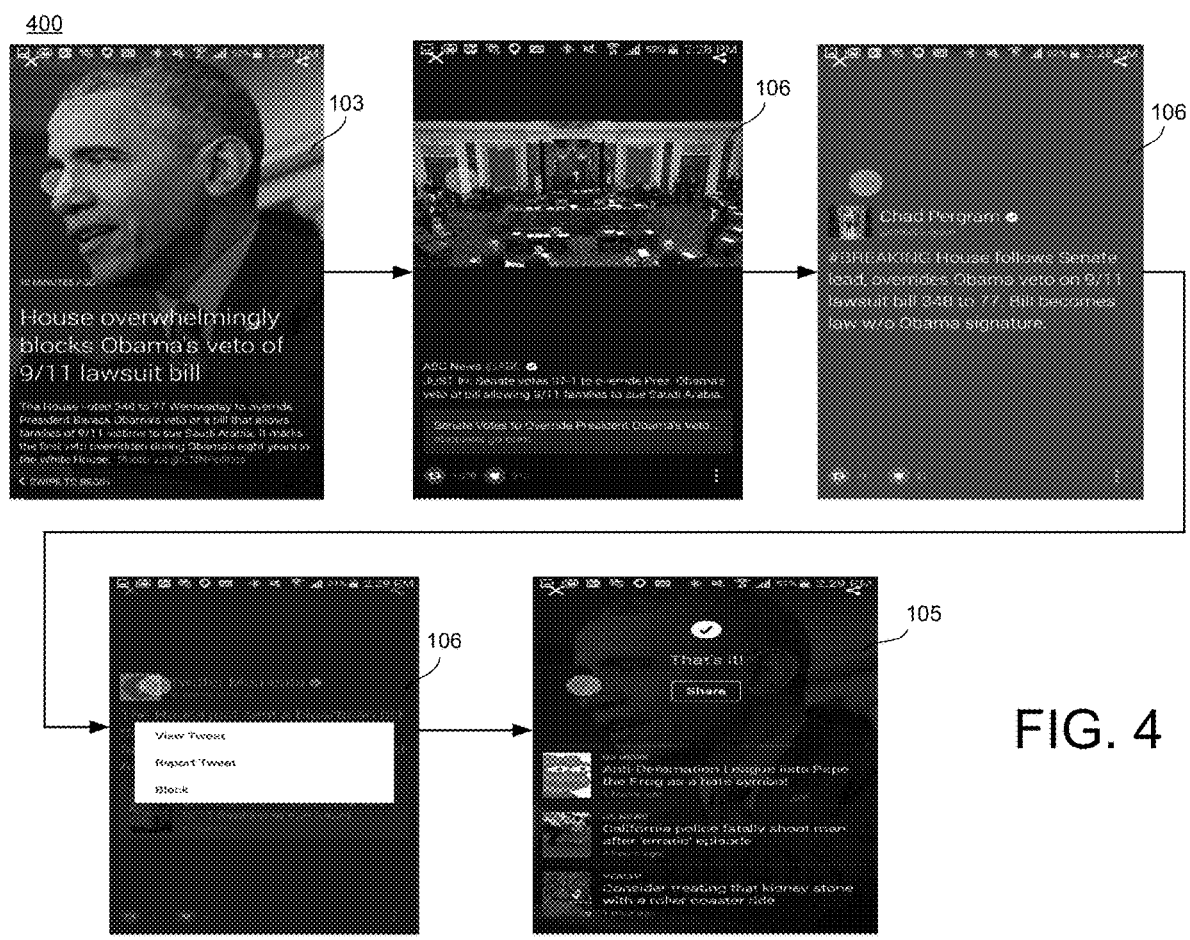
FIG. 4 illustrates an example screenshots of individual items of a selected moment according to an implementation.

Using the computing device 130, a user may click or tap on one of the moments 104 in the moment section 134 of the social media messaging application 132, which causes the social media messaging application 132 to open that moment 104 so that the user can view its contents, e.g., the collection of social media messages 106. FIG. 2 illustrates an example screenshot 200 of a mobile version of the social media messaging application 132 having the moment section 134 according to an implementation. The moment section 134 may take the form a central tab on the computing device 130. Referring to FIG. 2, the user can tap on an icon associated with the moment section 134 which instantiates a display of the moment section 134. FIG. 3 illustrates an example screenshot 300 of the moment section 134 of the social media messaging application 132 according to an implementation. The moment section 134 may provide a list of the moments 104, and the user can tap on one of the moments 104 to open that moment's content. FIG. 4 illustrates an example screenshots 400 of individual items of the selected moment 104 according to an implementation. The user can swipe through these items. For instance, the first item (e.g., the cover item 103) is initially displayed as a full-screen item on the computing device 130, which includes the headline, a short description of the event, and a cover image. Then the user can swipe through the following items, which includes interesting social media messages 106 about the event, until reaching the last item 105 that indicates that the moment 104 is finished. Each item can be displayed in full-screen, with big images and videos. Videos, Vines, and GIFS may auto-play while the user scrolls through the moment, and the user can turn the sound on or off by clicking or tapping the microphone icon. Also, the moment 104 may include a progress bar at the bottom that indicates how much more each moment 104 has to offer. In some examples, swiping up or down dismisses the moment 104, and takes the user back to the guide.

The user may operate the social media messaging application 132 to take various actions with any of the social media messages 106 within the moment 104 such as favoriting them, sharing them via links, re-messaging them, etc. For example, the user can click on any of the social media messages 106 included within the moment 104 to view the social media message 106 in detail. From there, a user can reply, re-post, and/or "favorite" or "like" the message. In some examples, a single tap gives a fuller view of the message, and a double tap lets the user instantly "favorite" the message. Also, the user can share the moment 104. For example, a user can post a social media message having a link to the moment 104 on the messaging platform 101 (or a different social media platform), post the moment 104 to its profile, and/or or share the moment's link via email, text, notification, etc. Also, the link to the moment 104 can be embedded into third party web sites.

Figure 5:
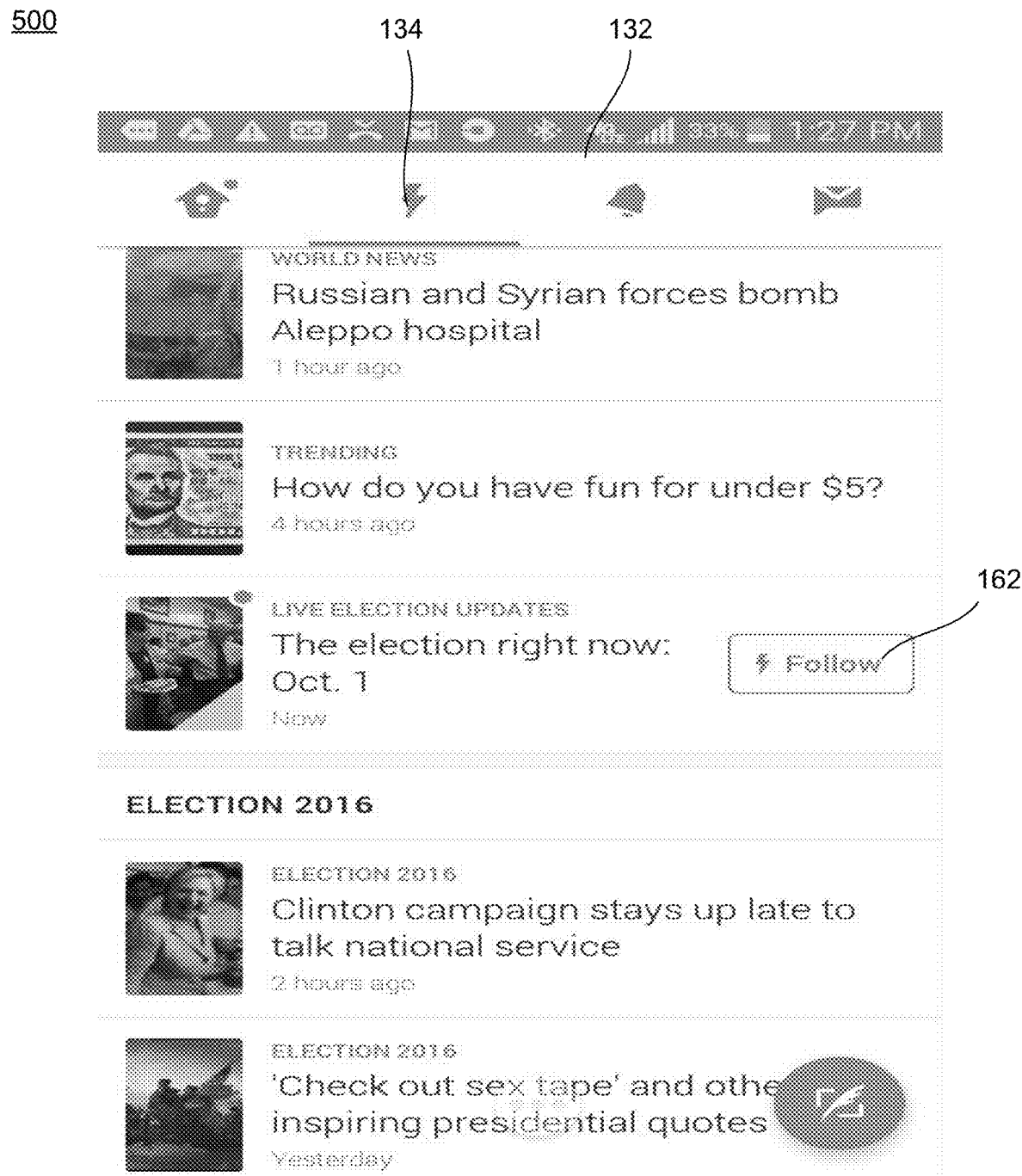
FIG. 5 illustrates an example screenshot of the moment section depicting a follow option that allows users to follow a particular moment according to an implementation.

The messaging platform 101 may allow users to follow some of the moments 104. FIG. 5 illustrates an example screenshot 500 of the moment section 134 depicting a follow option 162 that allows users to follow a particular moment 104 according to an implementation. For example, a user can tap on the follow option 162, which allows the user to follow the moment 104. When a user follows the moment 104, the messaging platform 101 may inject social media messages of users linked to the moment 104 in the user's home page or timeline as the event unfolds in real time. When the moment is complete, the messaging platform 101 may cease to inject messages related to the event in the user's timeline. Moments 104 are often updated as information or interesting messages become available on the messaging platform 101. A user may know a story has been updated since the user's last view when the user sees a blue dot in the upper right hand corner of the image associated with the moment 104. For stores that update very frequently (e.g., like live sporting events or awards shows where it's critical to know what's happening minute by minute), the messaging platform 101 may place the follow option 162 to follow the moment 104, which bends messages directly into the user's timeline. In this manner, the user can keep track of the latest updates in real-time without having to tap back and forth between tabs. When that story ends, so do the messages associated with the moment 104, leaving the user's timeline just as it was before.

In some examples, curators associated with the messaging platform 101 (e.g., an editorial board associated with or working for the platform) may create one or more of the moments 104. For example, a curator may search through the messages posted on the messaging platform 101 regarding a certain event, and manually select the ones that are more interesting and informative. In other examples, the messaging platform 101 may include a moment creator 102 configured to automatically create one or more of the moments 104 using a moment algorithm. For example, the moment creator 102 may use social media metrics and keyword identifiers in order to automatically select certain messages for inclusion within the moment. The moment creator 102 may automatically select messages posted from certain user accounts that are closely tied to the event. In some examples, the moment creator 102 may receive a video stream of the underlying event, and automatically create one or more video highlight clips, and include one or more of these video clips within the moment 104.

Figure 6:
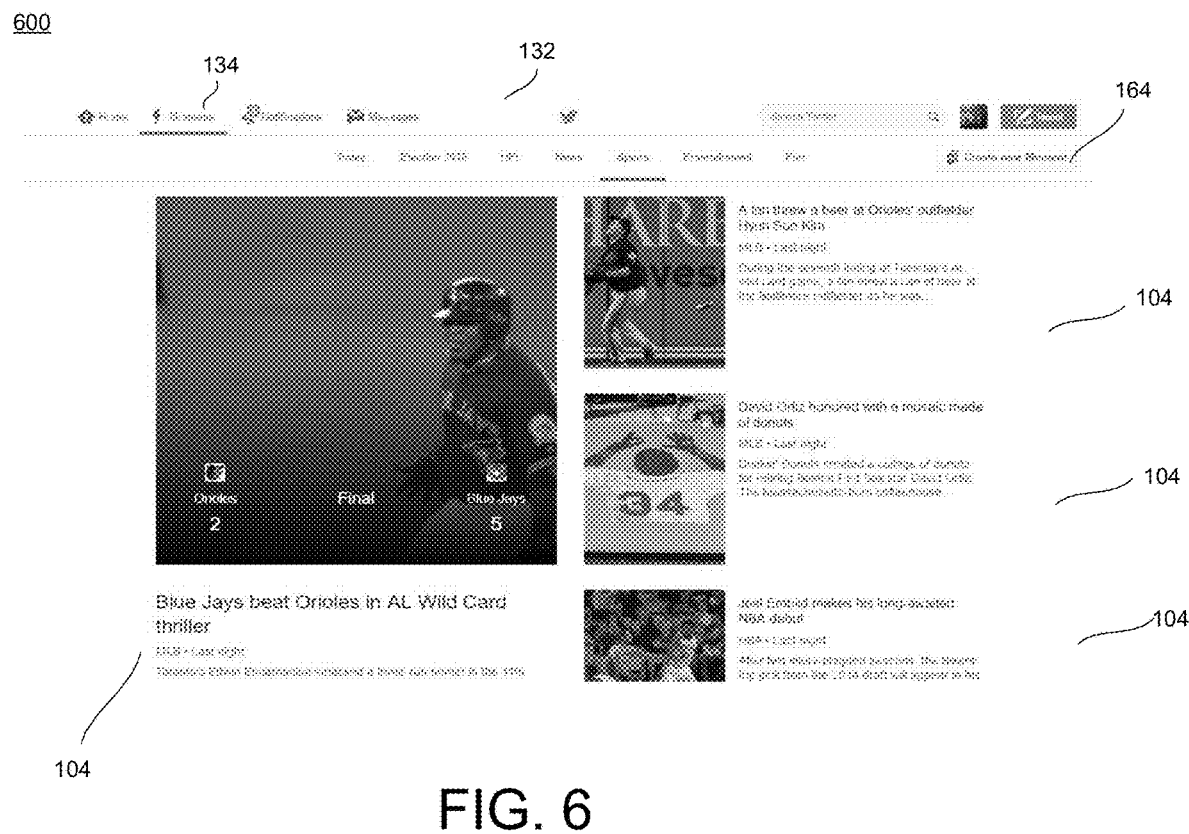
FIG. 6 illustrates an example screenshot of a web version of the moment section of the social media messaging application according to an implementation.
Figure 7:
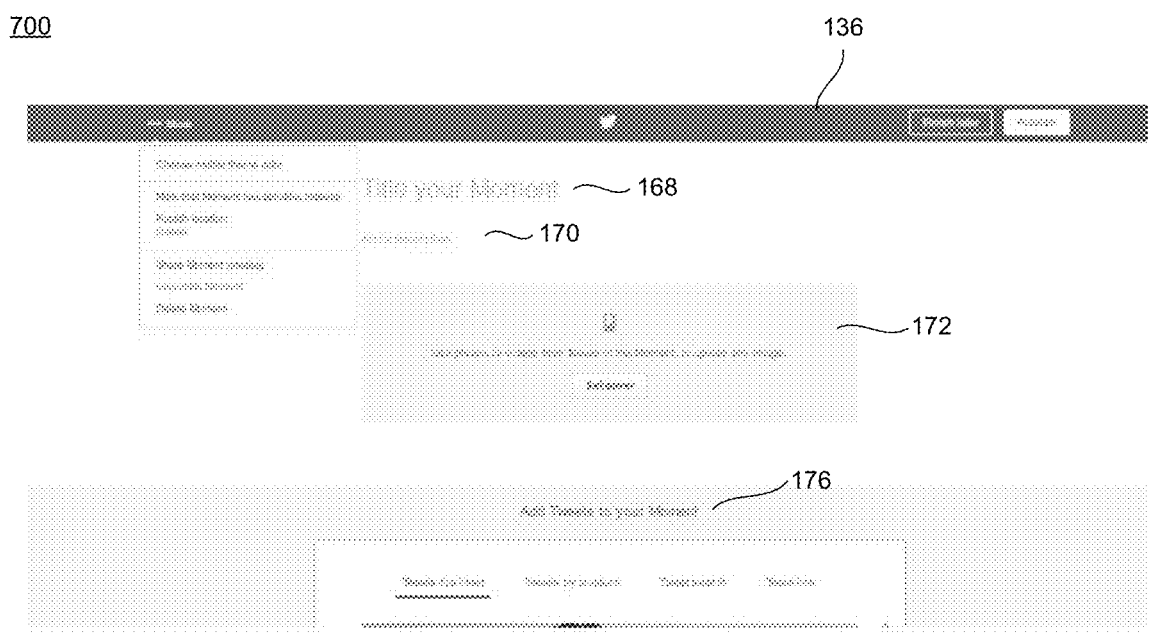
FIG. 7 illustrates an example screenshot of a moment creator interface on the social media messaging application according to an implementation.

Also, some of the moments 104 may be created by users of the social media messaging application 132. For example, the social media messaging application 132 may include a moment creator interface 136 configured to create a moment 104. FIG. 6 illustrates an example screenshot 600 of a web version of the moment section 134 of the social media messaging application 132 according to an implementation. As shown in FIG. 6, the moment section 134 provides an arrangement of the moments 104 that are available for selection. Also, the moment section 134 provides a moment creator icon 164, that, when selected, causes a display of the moment creator interface 136. FIG. 7 illustrates an example screenshot 700 of the moment creator interface 136 according to an implementation. The moment creator interface 136 includes a number of user-interface objects that allows a user to create a moment 104 to be shared with users of the messaging platform 101. The moment creator interface 136 may include a title object 168 that allows the user to create a title for the moment 104, and a description object 170 that allows the user to create a description for the moment 104. The moment creator interface 136 includes an image/video selector object 172 that allows the user to use videos/images that share been shared on the messaging platform 101 and/or allows the user to upload any image such as an image from the user's device. Also, the moment creator interface 136 may include a social media message selector object 176 that allows the user to identify and select social media messages that have been posted on the messaging platform 101. The user can select messages that have been liked by the user, select messages by accounts, select messages by performing keyword searches on the messaging platform 101, and/or select messages using their message links.

Optionally, the messaging platform 101 includes machine-learning resources to select programmatically events of interest to suggest to a particular user seeking to create moments 104. With this option, the user interacts with the system 100 via a GUI displayed by computing device 130. The machine-learning resources take input signals and predict which events may be of interest to the user and select these events to suggest to the user. Input signals to the machine learning resources include trends and buzz programmatically detected by the system 100. A spike in the number of social media messages referencing directly or otherwise a sporting event located in a city where the user has been determined to reside, for example, suggests the sporting event may be one for which the user may want to create a moment 104. Buzz about a brand reaching a threshold level in response to a commercial broadcasted during the sporting event, for example, suggests the commercial may be an event for which the user may wish to create moments 104, especially when the commercial is one of those compelling Super Bowl commercials. Where authorized by the user, the input signals further include preferences of the user as the system 100 has inferred from the user's previous engagements, which includes selections of social media messages to read, re-post, or about which to comment. Moreover, input signals further include preferences of other uses that the system 100 has determined to be likely to be interested in moments 104 created by the particular user at issue. These other users include, for example, those who follow the particular user or those who have interacted with moments 104 previously created by the particular user. To improve its accuracy at predicting which events may be of interest to the particular user, the machine learning resources periodically adjust its parameters, including the weights applied to input signals, based on the actual selections of the user.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

What is claimed is:

1. A method of sharing selectable moment messages in a social media network, the method comprising:
transmitting digital information, over a network, to render a timeline of a first user on a user interface of a client application, the timeline including a stream of messages posted by users having user accounts linked to a user account of the first user in a connection graph;
transmitting digital information, over the network, to render a selectable moment message on the user interface of the client application, the selectable moment message being associated with an event discussed on a messaging platform, wherein, before selection by the first user, the selectable moment message displays contextual information about the event, the selectable moment message being linked to a plurality of messages posted on the messaging platform by one or more users about the event, wherein selection of the selectable moment message by the first user causes the client application to open the selectable moment message to display a sequence of the plurality of messages, scrollable by the first user, that relate to the event;
receiving follower selection information, over the network, from the client application, the follower selection information indicating that a user interface object has been selected by the first user to follow the event over time;
injecting, during a course of the event and after receipt of the follower selection information, a message posted by a second user to the messaging platform about the event into the stream of messages rendered on the timeline of the first user, wherein a user account of the second user is not linked to the user account of the first user within the connection graph; and
removing the message posted by the second user from the stream of messages rendered on the timeline of the first user in response to an expiration of the event.

2. The method of claim 1, wherein the digital information includes display format data indicating a manner in which the plurality of messages are to be displayed, wherein the display format data indicates to display at least one of the plurality of messages of the selectable moment message in full display format.

3. The method of claim 1, wherein the selectable moment message is linked to a first item having at least one of image or text that describes the event and a last item that indicates that the first user is caught up on the event, the plurality of messages being disposed between the first item and the last item.

4. The method of claim 1, further comprising:
linking an additional message posted by a third user on the messaging platform with the selectable moment message during the course of the event such that the additional message is inserted into the sequence of the plurality of messages of the selectable moment message.

5. The method of claim 1, wherein each of the plurality of messages displays a progress bar that indicates the first user's progress through the sequence of the plurality of messages.

6. The method of claim 1, further comprising:
receiving moment creation information from the second user, the moment creation information identifying the plurality of messages for the selectable moment message; and
generating the selectable moment message based on the moment creation information.

7. The method of claim 1, further comprising:
identifying at least one of the event or the plurality of messages linked to the selectable moment message based on machine-learning resources implemented at the messaging platform, the machine-learning resources being inputted with signals that include at least one of trends, buzz, user preferences, or previous user engagements; and
periodically updating weights applied to the signals based on actual selections of users.

8. The method of claim 1, further comprising:
receiving a request to embed the selectable moment message; and
generating hypertext markup language (HTML) data for the selectable moment message in response to the request.

9. The method of claim 1, further comprising:
receiving a message posted by the first user to the messaging platform, the message identifying the selectable moment message; and
transmitting, by the messaging platform, the message posted by the first user to users linked to the first user in the connected graph.

10. A system for exchanging selectable moment messages in a social media network, the system comprising:
a client application, executable by a computing device, configured to render a timeline of a first user on a user interface of the client application, the timeline including a stream of messages posted by users having user accounts linked to a user account of the first user in a connection graph; and
a messaging platform, executable by a server computer, configured to communicate with the client application over a network, the messaging platform configured to:
transmit digital information, over the network, to render a selectable moment message on the user interface of the client application, the selectable moment message being associated with an event discussed on the messaging platform, wherein, before selection by the first user, the selectable moment message displays contextual information about the event, the selectable moment message being linked to a plurality of messages posted on the messaging platform by one or more users about the event, wherein selection of the selectable moment message by the first user causes the client application to open the selectable moment message to display a sequence of the plurality of messages, scrollable by the first user, that relate to the event;
receive follower selection information, over the network, from the client application, the follower selection information indicating that a user interface object has been selected by the first user to follow the event over time;
inject, during a course of the event and after receipt of the follower selection information, a message posted by a second user to the messaging platform about the event into the stream of messages rendered on the timeline of the first user, wherein a user account of the second user is not linked to the user account of the first user within the connection graph, wherein the message posted by the second user is not associated with an action taken with respect to the first user, the message having been posted to the messaging platform by the second user after receipt of the follower selection information and before the event expires; and remove the message posted by the second user from the stream of messages rendered on the timeline of the first user in response to an expiration of the event.

11. The system of claim 10, wherein the client application is configured to transition through the sequence of the plurality of messages in response to receipts of user gestures on the user interface of the client application.

12. The system of claim 10, wherein the selectable moment message is created based on a combination of user selection and programmatic selection.

13. The system of claim 10, wherein the messaging platform includes machine-learning resources, and the messaging platform is configured to identify at least one of the event or the plurality of messages linked to the selectable moment message based on the machine-learning resources inputted with signals that include trends, buzz, user preferences, and previous user engagements.

14. The system of claim 10, wherein the messaging platform is configured to link an additional message posted by a third user on the messaging platform with the selectable moment message during the course of the event such that the additional message is inserted into the sequence of the plurality of messages of the selectable moment message.

15. The system of claim 10, wherein the messaging platform is configured to receive a request to embed the selectable moment message and generate hypertext markup language (HTML) data for the selectable moment message in response to the request.

16. A non-transitory computer-readable medium storing executable instructions that, when executed by at least one processor, are configured to cause the at least one processor to:

transmit digital information, over a network, to render a home timeline of a first user on a user interface of a client application, the home timeline including a stream of messages posted by users having user accounts linked to a user account of the first user in a connection graph;

transmit digital information, over the network, to render a profile timeline of the first user on the user interface of the client application, the profile timeline displaying user activities taken with respect to the first user;

transmit digital information, over the network, to render a selectable moment message on the user interface of the client application, the selectable moment message being associated with an event discussed on the messaging platform, wherein, before selection by the first user, the selectable moment message displays contextual information about the event, the contextual information including text and image data about the event, the selectable moment message being linked to a plurality of messages posted on the messaging platform by one or more users about the event, wherein selection of the selectable moment message by the first user causes the client application to open the selectable moment message to display a sequence of the plurality of messages, scrollable by the first user, that relate to the event such that the plurality of messages are displayed one at a time;

receive follower selection information over the network from the client application, the follower selection information indicating that a user interface object has been selected by the first user to follow the event over time;

inject, during a course of the event and after receipt of the follower selection information, a message posted by a second user to the messaging platform about the event into the stream of messages rendered on the home timeline of the first user during a duration of the event, wherein a user account of the second user is not linked to the user account of the first user within the connection graph, wherein the message posted by the second user is not associated with an action taken with respect to the first user;

cease to inject messages posted by the second user into the stream of messages rendered on the home timeline of the first user in response to the event expiring;

remove the message posted by the second user from the stream of messages rendered on the home timeline of the first user in response to the event expiring such that the home timeline of the first user returns to a state before the first user followed the event.

17. The non-transitory computer-readable medium of claim 16, wherein each of the plurality of messages displays a progress bar that indicates the first user's progress through the sequence of the plurality of messages.

18. The non-transitory computer-readable medium of claim 16, further comprising:

receive a request to embed the selectable moment message; and generate hypertext markup language (HTML) data for the selectable moment message in response to the request.

19. The non-transitory computer-readable medium of claim 16, further comprising:

identify at least one of the event or the plurality of messages linked to the selectable moment message based on machine-learning resources inputted with signals that include at least one of trends, buzz, user preferences, or previous user engagements.

* * * * *